(12) United States Patent
Lv (10) Patent No.: US 12,199,512 B2
(45) Date of Patent: Jan. 14, 2025

(54) CONTROLLER, SWITCHED-MODE POWER SUPPLY AND METHOD FOR CONTROLLING SWITCHED-MODE POWER SUPPLY

(71) Applicant: SHANGHAI BRIGHT POWER SEMICONDUCTOR CO., LTD., Shanghai (CN)

(72) Inventor: Danzhu Lv, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 234 days.

(21) Appl. No.: 18/078,236

(22) Filed: Dec. 9, 2022

(65) Prior Publication Data

US 2023/0198400 A1 Jun. 22, 2023

(30) Foreign Application Priority Data

Dec. 22, 2021 (CN) .......................... 202111580339.X (51) Int. Cl.
*H02M 3/158* (2006.01)
*H02M 1/00* (2006.01)

(52) U.S. Cl.
CPC ......... *H02M 3/158* (2013.01); *H02M 1/0022* (2021.05); *H02M 1/0025* (2021.05)

(58) Field of Classification Search
CPC ... H02M 3/158; H02M 1/0022; H02M 1/0025
See application file for complete search history.

(56) References Cited

U.S. PATENT DOCUMENTS

| | | | |
|---|---|---|---|
| 10,063,143 B1* | 8/2018 | Fan ........................ | H02M 5/458 |
| 11,264,897 B2* | 3/2022 | Wiktor ..................... | H03K 7/08 |
| 2004/0140719 A1* | 7/2004 | Vulih ........................ | H02J 9/04 |
| | | | 307/80 |
| 2010/0238689 A1* | 9/2010 | Fei .................... | H02M 3/33523 |
| | | | 363/21.16 |

* cited by examiner

*Primary Examiner* — Jue Zhang
*Assistant Examiner* — Lakaisha Jackson
(74) *Attorney, Agent, or Firm* — MUNCY, GEISSLER, OLDS & LOWE, P.C.

(57) ABSTRACT

The present invention provides a controller, a switched-mode power supply and a method for controlling a switched-mode power supply. In response to a change of the switched-mode power supply from a continuous conduction mode to a discontinuous conduction mode, slope compensation is carried out with an output peak voltage raised by a compensating DC offset. Moreover, in response to a change of the switched-mode power supply from the discontinuous conduction mode to the continuous conduction mode, the compensating DC offset is subtracted from the peak voltage. In this way, an additional DC offset that would be introduced by a conventional slope compensation approach can be eliminated, maintaining a valley of a sampled feedback voltage constant both under steady load conditions and during load jumps.

19 Claims, 7 Drawing Sheets

CONTROLLER, SWITCHED-MODE POWER SUPPLY AND METHOD FOR CONTROLLING SWITCHED-MODE POWER SUPPLY

CROSS-REFERENCE TO RELATED APPLICATION

This application claims the priority of Chinese patent application number 202111580339.X, filed on Dec. 22, 2021, the entire contents of which are incorporated herein by reference.

TECHNICAL FIELD

The present invention relates to the field of electric power and, in particular, to a controller, a switched-mode power supply and a method for controlling a switched-mode power supply.

BACKGROUND

A switched-mode power supply can provide a constant output voltage within a certain load range. Switched-mode power supplies are structurally stable, efficient and diverse in control mode, so they have been widely used in high-power applications for voltage conversion. The constant on-time (COT) control mode is one of the most commonly used control modes in the field of switched-mode power supplies. This COT control mode comprises a simple compensation loop, less reliance on peripheral devices, which facilitates board-level integration, fast response and high efficiency under light load conditions.

For a switched-mode power supply operating in a COT control mode, its on-time is relatively constant and related to a predetermined operating frequency, while its off-time is determined by a moment at which a sampled feedback voltage VFB drops to an internal reference and susceptible to noise caused by the parasitics of the PCB and traces therein. Such noise tends to lead to jitter, which varies the cycle length and deteriorates the system's constant frequency characteristics. Frequency jitter will be significant when such noise is at a high level. The jitter problem can be mitigated by increasing the slope of the sampled feedback voltage VFB or adding a slope to the reference voltage. However, increasing the slope of VFB will lead to a proportional increase of output ripple, which means greater noise that will be imposed on the downstream sensitive circuits. Therefore, this approach is insensible. The common practice in the industry is to add a slope of a certain amplitude to the reference voltage. This is equivalent to adding a compensation slope of the same amplitude to VFB, which increases a falling slope of VFB and greatly enhance its noise rejection capability.

Due to the presence of frequency jitter, the compensation slope is generally configured with a margin, rather than to be zeroed, at the expected cycle length, in order to ensure that the slope will not be affected when the cycles are disturbed. The resulted DC differences are generally eliminated using an additional DC loop. However, due to the use of a feedback op-amp and loop stability requirements, the DC loop shows slow response and only for steady-state accuracy correction.

A switched-mode power supply can operate in a continuous conduction mode (CCM) under heavy load conditions, or in a discontinuous conduction mode (DCM) under light load conditions. When changing from the CCM (heavy load condition) to the DCM (light load condition), output ripple will be increased since most current is charged to an output capacitor within each cycle, so the frequency jitter problem can be mitigated. Therefore, additional slope compensation is unnecessary in the DCM. Conventionally, in change from the CCM to DCM, the compensation slope added to the reference voltage is clamped upon it drops to zero. In this way, slope compensation is removed in the DCM mode, and it can be determined simply when to conduct the power switch in the next cycle from a comparison between the sampled feedback voltage VFB and the reference voltage. Slope compensation can be resumed when changing from the DCM back to CCM. However, this approach introduces a problem of an additional DC offset when the load changes quickly, which may lead to an output DC error. Consequently, the load jump would be accompanied by significant upward and downward overshooting of the output voltage, which is detrimental to performance.

SUMMARY OF THE INVENTION

The present invention provides a controller, a switched-mode power supply and a method for controlling a switched-mode power supply, which avoid the introduction of an additional DC offset that may arise from the conventional slope compensation approach. Therefore, the switched-mode power supply exhibits enhanced performance during instantaneous load jumps.

In one aspect, the present invention provides a controller for controlling a power switching device in a switched-mode power supply, the switched-mode power supply configured for converting an input DC voltage to an output DC voltage, wherein the controller comprises:

a sampling and feedback circuit, configured to derive a sampled feedback voltage from the output DC voltage;

a slope compensation circuit, configured to output a periodically varying slope voltage and a peak voltage and to provide a compensation voltage based on the peak voltage and the slope voltage; and a comparison circuit configured to, in each switching period, compare the sampled feedback voltage with a sum of a reference voltage and the compensation voltage to determine when to conduct the power switching device in a next switching period, wherein the peak voltage is raised by a compensating DC offset in response to a change of the switched-mode power supply from a continuous conduction mode to a discontinuous conduction mode, and the compensating DC offset is subtracted from the peak voltage in response to a change of the switched-mode power supply from the discontinuous conduction mode to the continuous conduction mode.

Optionally, the comparison circuit may comprise a DC correction circuit configured to compare the sampled feedback voltage with the reference voltage and to clamp a steady-state value of the sampled feedback voltage at the reference voltage by an error amplifier.

Optionally, the slope compensation circuit may comprise:

a slope generator, configured to generate a periodic voltage signal with an amplitude below a value of a first voltage reference;

a transconductance amplifier coupled to an output of the slope generator and configured to convert the voltage signal into a current signal; and a first resistor and a second resistor connected in series between the first voltage reference and the ground with a connection node coupled to an output of the transconductance amplifier so that a voltage generated by the current signal and the first voltage reference on the second resistor serves as the slope voltage.

Optionally, the slope compensation circuit may comprise a peak voltage output unit for generating the peak voltage, wherein the peak voltage output unit comprises a selection circuit configured to raise the peak voltage by the compensating DC offset based on a moment at which the switched-mode power supply changes from the continuous conduction mode to the discontinuous conduction mode, and to subtract the compensating DC offset from the peak voltage based on a moment at which the switched-mode power supply changes from the discontinuous conduction mode to the continuous conduction mode.

Optionally, the peak voltage output unit may further comprise a first current source and a third resistor, wherein: the first current source is coupled to a first end of the third resistor, a voltage drop generated by the first current source across the third resistor is equal to the compensating DC offset; the third resistor is coupled at a second end to a first voltage reference, a second voltage is output from a connection node between the first current source and the third resistor; wherein the selection circuit selects the second voltage as the peak voltage in response to a change of the switched-mode power supply from the continuous conduction mode to the discontinuous conduction mode and selects the first voltage reference as the peak voltage in response to a change of the switched-mode power supply from the discontinuous conduction mode to the continuous conduction mode.

Optionally, the selection circuit may further comprise a hysteresis unit configured to introduce a first predetermined length of wait time before raising the peak voltage by the compensating DC offset when the switched-mode power supply changes from the continuous conduction mode to the discontinuous conduction mode, and to introduce a second predetermined length of wait time before subtracting the peak voltage by the compensating DC offset when the switched-mode power supply changes from the discontinuous conduction mode to the continuous conduction mode.

Optionally, the slope compensation circuit may comprise a peak voltage output unit for generating the peak voltage, wherein the peak voltage output unit comprises:
a first capacitor having a first end at which the peak voltage is output and a second end that is grounded;
a second current source having an input terminal coupled to the first end of the first capacitor and an output terminal that is grounded, the second current source providing a discharge path for the peak voltage;
an op-amp having a first input terminal where the peak voltage is received and a second input terminal where the slope voltage is received; and
a switching transistor having a control terminal coupled to the output terminal of the operational amplifier, wherein the switching transistor is turned on in an event of the peak voltage dropping below the slope voltage to allow an on-chip power supply to charge the first capacitor through the switching transistor until the peak voltage reaches the slope voltage.

In another aspect, the present invention provides a switched-mode power supply comprising a power switching device, an energy storage component, an output capacitor and a controller, the controller configured to control the power switching device to periodically feed an input DC voltage to the energy storage component and the output capacitor so as to obtain an output DC voltage on the output capacitor, wherein the controller comprises:

a sampling and feedback circuit, configured to derive a sampled feedback voltage from the output DC voltage;
a slope compensation circuit, configured to output a periodically varying slope voltage and a peak voltage and to provide a compensation voltage based on the peak voltage and the slope voltage;
a comparison circuit, configured to, in each switching period, compare the sampled feedback voltage with a sum of a reference voltage and the compensation voltage to determine when to conduct the power switching device in a next switching period,
wherein the peak voltage is raised by a compensating DC offset in response to a change of the switched-mode power supply from a continuous conduction mode to a discontinuous conduction mode, and the compensating DC offset is subtracted from the peak voltage in response to a change of the switched-mode power supply from the discontinuous conduction mode to the continuous conduction mode.

Optionally, the comparison circuit may comprise a DC correction circuit configured to compare the sampled feedback voltage with the reference voltage and to clamp a steady-state value of the sampled feedback voltage at the reference voltage by an error amplifier.

Optionally, the slope compensation circuit may comprise:
a slope generator configured to generate a periodic voltage signal with an amplitude below a value of a first voltage reference;
a transconductance amplifier coupled to an output of the slope generator and configured to convert the voltage signal into a current signal; and
a first resistor and a second resistor connected in series between the first voltage reference and the ground with a connection node coupled to an output of the transconductance amplifier so that a voltage generated by the current signal and the first voltage reference on the second resistor serves as the slope voltage.

Optionally, the slope compensation circuit may comprise a peak voltage output unit for generating the peak voltage, wherein the peak voltage output unit comprises a selection circuit configured to raise the peak voltage by the compensating DC offset based on a moment at which the switched-mode power supply changes from the continuous conduction mode to the discontinuous conduction mode and to subtract the compensating DC offset from the peak voltage based on a moment at which the switched-mode power supply changes from the discontinuous conduction mode to the continuous conduction mode.

Optionally, the peak voltage output unit may further comprise a first current source and a third resistor, wherein the first current source is coupled to a first end of the third resistor, a voltage drop generated by the first current source across the third resistor is equal to the compensating DC offset; the third resistor is coupled at a second end to a first voltage reference, a second voltage is output from a connection node between the first current source and the third resistor; wherein the selection circuit selects the second voltage as the peak voltage in response to a change of the switched-mode power supply from the continuous conduction mode to the discontinuous conduction mode, and selects the first voltage reference as the peak voltage in response to a change of the switched-mode power supply from the discontinuous conduction mode to the continuous conduction mode.

Optionally, the selection circuit may further comprise a hysteresis unit configured to introduce a first predetermined length of wait time before raising the peak voltage by the compensating DC offset when the switched-mode power supply changes from the continuous conduction mode to the discontinuous conduction mode, and to introduce a second predetermined length of wait time before subtracting the peak voltage by the compensating DC offset when the switched-mode power supply changes from the discontinuous conduction mode to the continuous conduction mode.

Optionally, the moment at which the switched-mode power supply changes from the continuous conduction mode to the discontinuous conduction mode may be determined based on a moment at which a current flowing through the energy storage component drops to zero.

Optionally, the slope compensation circuit may comprise a peak voltage output unit for generating the peak voltage, wherein the peak voltage output unit comprises:
- a first capacitor having a first end at which the peak voltage is output and a second end that is grounded;
- a second current source having an input terminal coupled to the first end of the first capacitor and an output terminal that is grounded, the second current source providing a discharge path for the peak voltage;
- an op-amp having a first input terminal where the peak voltage is received and a second input terminal where the slope voltage is received; and
- a switching transistor having a control terminal coupled to the output terminal of the operational amplifier, wherein the switching transistor is turned on in an event of the peak voltage dropping below the slope voltage to allow an on-chip power supply to charge the first capacitor through the switching transistor until the peak voltage reaches the slope voltage.

In yet another aspect, the present invention provides a method for controlling a switched-mode power supply to convert an input DC voltage to an output DC voltage, wherein the method comprises:
- deriving a sampled feedback voltage from the output DC voltage;
- generating a periodically varying slope voltage and a peak voltage and providing a compensation voltage based on the peak voltage and the slope voltage; and
- in each switching period, comparing the sampled feedback voltage with a sum of a reference voltage and the compensation voltage to determine when to conduct a power switching device in a next switching period,
- wherein the peak voltage is raised by a compensating DC offset in response to a change of the switched-mode power supply from a continuous conduction mode to a discontinuous conduction mode, and the compensating DC offset is subtracted from the peak voltage in response to a change of the switched-mode power supply from the discontinuous conduction mode to the continuous conduction mode.

Optionally, the method may further comprise a DC correction for comparing the sampled feedback voltage with the reference voltage and clamping a steady-state value of the sampled feedback voltage at the reference voltage by an error amplifier.

The controller provided in the present invention is used to control a power switching device in a switched-mode power supply for converting an input DC voltage into an output DC voltage. The controller includes a sampling and feedback circuit, a slope compensation circuit and a comparison circuit. A peak voltage output from the slope compensation circuit is raised by a compensating DC offset in response to a change of the switched-mode power supply from a continuous conduction mode to a discontinuous conduction mode. The compensating DC offset is subtracted from the peak voltage in response to a change of the switched-mode power supply from the discontinuous conduction mode to the continuous conduction mode. In this way, an additional DC offset that would be introduced by the conventional slope compensation approach can be eliminated, maintaining a valley of a sampled feedback voltage constant both under steady load conditions and during load jumps. Compared with the conventional slope compensation approach, upward and downward overshooting of an output voltage during load jumps can be effectively reduced and performance of the switched-mode power supply during instantaneous load jumps can be enhanced. The switched-mode power supply and the method provided in the present invention retain similar advantages.

DESCRIPTION OF REFERENCE NUMERALS IN DRAWINGS

100: Slope compensation circuit; 110: Slope voltage Output Unit; 120, 130: Peak Voltage Output Unit.

DETAILED DESCRIPTION

The controller, switched-mode power supply and method proposed in the present invention will be described in greater detail below with reference to particular embodiments and the accompanying drawings. From the following description, advantages and features of the invention will become more apparent. Note that the figures are provided in a very simplified form not necessarily drawn to exact scale and for the only purpose of facilitating easy and clear description of the embodiments.

A switched-mode power supply provides a constant output voltage through periodic and dynamic adjustment of energy output to an energy storage component by a power switching device. As discussed in the Background section, for a switched-mode power supply operating in a COT mode, adding a slope of a certain amplitude to its reference voltage is equivalent to adding a slope of the same amplitude to its sampled feedback voltage VFB, which increases an equivalent falling slope of the sampled feedback voltage VFB and greatly enhance its noise rejection capability.

Figure 1:
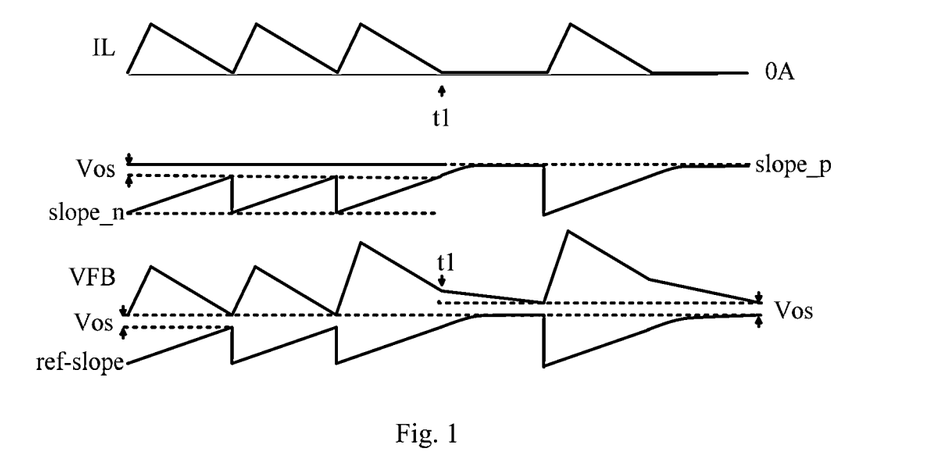
FIG. 1 schematically illustrates a compensation slope provided by a conventional slope compensation approach and how it affects a valley of a sampled feedback voltage.

FIG. 1 schematically illustrates a compensation slope provided by a conventional slope compensation approach and how it affects a valley of a sampled feedback voltage. In FIG. 1, the top graph shows an inductor current IL, the middle graph shows a slope voltage slope_n employed in the conventional slope compensation approach, and the bottom graph shows the sampled feedback voltage VFB that is derived from an output voltage and a compensation voltage ref-slope. As shown in FIG. 1, slope_n is a periodically varying slope voltage with an amplitude representing the magnitude of the compensation slope. Slope_p represents a peak of the slope voltage, and the difference between the two, as expressed by slope=slope_p−slope_n, serves as the compensation voltage for a reference voltage. The compensation voltage is configured with a margin Vos left, rather than to be zeroed, at the ideal cycle length, in order to ensure that slopes of the sampled feedback voltage VFB and the slope-compensated reference voltage (the waveforms vary in the same as ref-slope in FIG. 1) at the contact points remain substantially unaffected when the cycles are disturbed.

Figure 2:
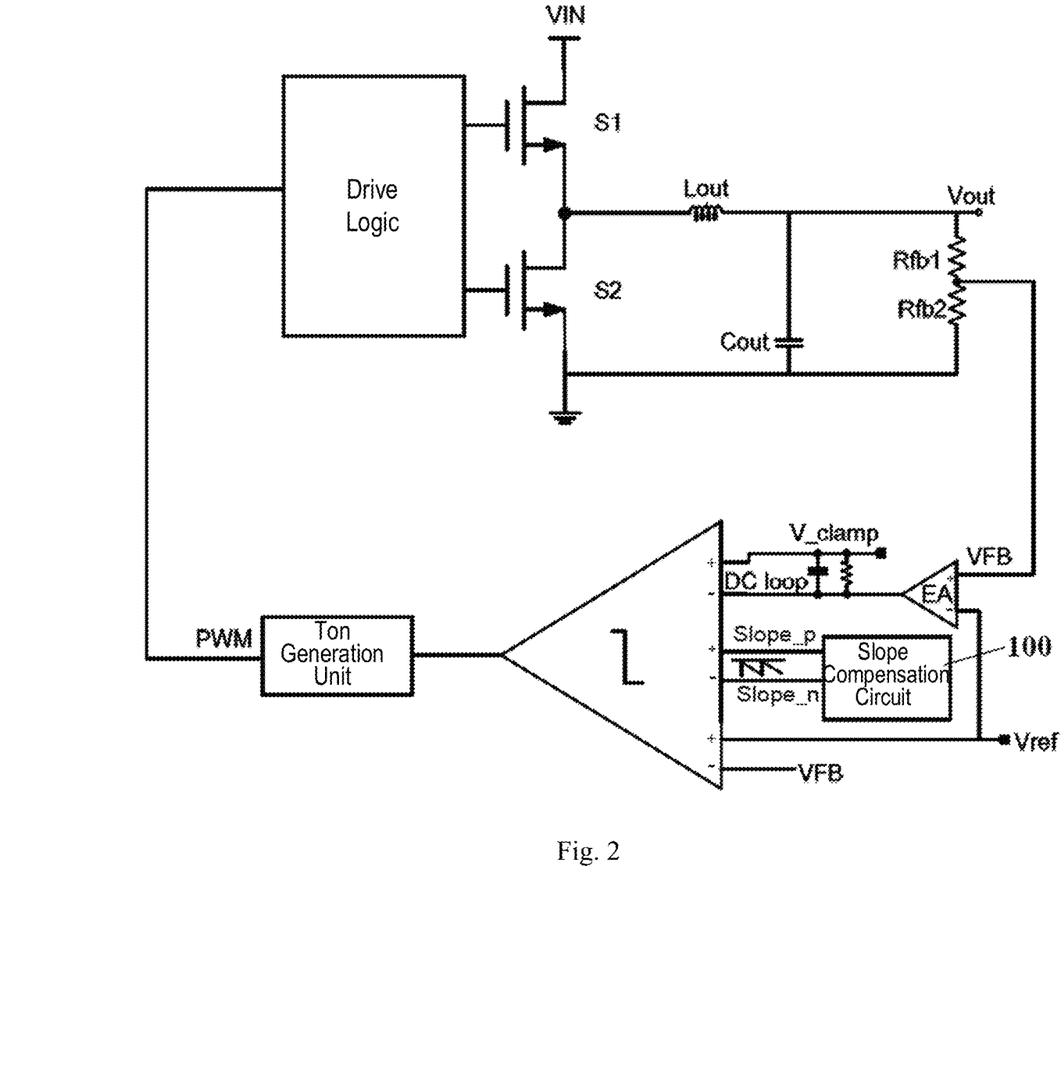
FIG. 2 is a schematic illustration of a switched-mode power supply according to an embodiment of the present invention.

In the first two cycles in FIG. 1, the switched-mode power supply is in a CCM where there is a compensating DC offset Vos between the sampled feedback voltage VFB and the compensation voltage ref-slope. When in a steady state, the compensating DC offset Vos is cancelled out by a DC loop. The present invention is not limited to any particular architecture of the DC loop. It may be implemented as a circuit consisting of a resistor, a capacitor and an error amplifier EA, as shown in FIG. 2 and described in detail below.

However, in the latter two cycles in FIG. 1, the switched-mode power supply experiences a load change and changes from the CCM to a discontinuous conduction mode, such as DCM. As a result, the inductor current IL crosses zero at t1, and upper and lower power transistors in the switched-mode power supply are turned off. The compensation slope is clamped at zero, and therefore the difference between the sampled feedback voltage VFB and the compensation voltage ref-slope drops to zero at the contact point. However, as the DC loop does not have sufficient time to adjust its amount of correction, the compensating DC offset Vos is still present and raises the valley of the sampled feedback voltage VFB by an amount equivalent to the compensating DC offset Vos. This rise in voltage is amplified by the sampled feedback voltage VFB output at the output terminal, causing overshooting in the output DC voltage from the switched-mode power supply. During switching from the CCM to DCM, excessive current stored in an output capacitor due to delayed loop response causes the output to overshoot, however, the raised valley of the sampled feedback voltage VFB as a consequence of clamping of the slope voltage slope_n can exaggerate the overshoot, deteriorating performance characteristics during the load jump. If a sampled feedback coefficient of the output DC voltage is P, the overshoot Vout_delta caused to the output terminal by the clamping of the compensation slope will be equal to Vos/p, i.e., Vout_delta=Vos/P.

In principle, the present invention seeks to enhance performance of the switched-mode power supply during instantaneous load jumps by eliminating the additional DC offset introduced in the conventional slope compensation approach. The controller, the switched-mode power supply incorporating the controller and the method for controlling a switched-mode power supply according to embodiments of the present invention all adopt an adaptive slope compensation approach. For example, in the event of a load jump, a compensation slope added to a reference voltage Vref is allowed to be clamped after it drops to zero, and a compensation equaling a compensating DC offset used prior to the jump is applied to a reference voltage Vref. At the same time, the use of a DC loop for steady-state correction is still allowed. In this way, during the load jump, a DC offset can be dynamically eliminated to optimize the performance characteristics and output accuracy. With the advantages of slope compensation being retained, an output DC error that may be introduced by slope compensation during switching between operating modes for different load conditions, as shown in the FIG. 1, can be eliminated in an adaptive manner, resulting in enhanced performance during instantaneous load jumps.

The switched-mode power supply according to embodiments of the present invention may adopt one of the non-isolated buck, non-isolated boost, non-isolated buck-boost, isolated flyback and other circuit topologies. Here, the switching controller employs, for example, the constant on-time (COT) control mode.

A switched-mode power supply according to an embodiment of the present invention may include a power switching device, an energy storage component, an output capacitor and a controller, as schematically illustrated in FIG. 2. Referring to FIG. 2, as an example, the switched-mode power supply converts an input DC voltage VIN into an output DC voltage Vout. The power switching device includes an upper power transistor S1 and a lower power transistor S2, and the energy storage component includes an inductor Lout. The input DC voltage VIN is coupled to a source of the upper power transistor S1, while a source of the lower power transistor S2 is grounded. Drains of the upper power transistor PM and the lower power transistor NM are coupled to one end of the inductor L, and the other end of the inductor L is coupled to one end of the output capacitor C. The other end of the output capacitor Cout is grounded.

According to an embodiment of the present invention, the controller in the switched-mode power supply controls the power switching device to periodically feed the input DC voltage VIN to the energy storage component and the output capacitor, and the output DC voltage Vout is responsively present on the output capacitor. The controller includes a sampling and feedback circuit, a slope compensation circuit 100 and a comparison circuit. The sampling and feedback circuit can be used to obtain a sampled feedback voltage VFB based on the output DC voltage, and the slope compensation circuit can output a periodically varying slope voltage Slope_n and a peak voltage Slope_p and provide a compensation voltage ref-slope based on the peak voltage Slope_p and the slope voltage Slope_n. The comparison circuit can be used to compare the sampled feedback voltage VFB with the sum of a reference voltage Vref and the compensation voltage ref-slope within each switching period to determine when to conduct the power switching device in the next switching period. When the switched-mode power supply changes from a continuous conduction mode (CCM) to a discontinuous conduction mode (DCM), the peak voltage Slope_p will be raised by a compensating DC offset. On the contrary, when the switched-mode power supply changes from the discontinuous conduction mode to the continuous conduction mode, the compensating DC offset will be subtracted from the peak voltage Slope_p. More detailed description is set forth below.

Referring to FIG. 2, the sampling and feedback circuit includes series resistors Rfb1 and Rfb2 for obtaining the sampled feedback voltage VFB by dividing the output DC voltage Vout. The difference between the sampled feedback voltage VFB and the reference voltage Vref is amplified by an error amplifier EA, and the resulting error voltage signal is corrected by a DC loop and input to the comparison circuit. The comparison circuit additionally receives the sampled feedback voltage VFB, the periodically varying slope voltage (slope_n) from the slope compensation circuit 100 and the peak voltage (slope_p), compares, in each switching period, the sampled feedback voltage with the sum of the reference voltage and the compensation voltage, and outputs a trigger and turn-on signal which is then modulated into an output pulse width modulation (PWM) signal by a Ton generation unit.

As shown in FIG. 2, the controller may further include a drive circuit for turning on or off each of the upper power transistor S1 and the lower power transistor S2. For example, during an on-time interval, the upper power transistor S1 may be turned on and the lower power transistor S2 may be turned off, ramping up a current in the inductor. After the fixed on-time interval elapses, the upper power transistor S1 may be turned off and the lower power transistor S2 may be turned on, ramping down the inductor current. It is to be noted that the structure shown in FIG. 2 is merely an example, and the present invention is not limited to any particular architecture of the switched-mode power supply. The controller described in the embodiments described herein can be used in various suitable switched-mode power supplies.

According to embodiments of the present invention, in the switched-mode power supply, the DC loop can be used to eliminate the compensating DC offset (e.g., Vos in FIG. 1) in each cycle. As shown in FIG. 2, for example, the DC loop may comprise a clamping voltage (V Clamp) input to the comparison circuit discussed above. A capacitor and a resistor may be connected in parallel between the clamping voltage signal and an output of the error amplifier EA. The present invention is not limited to any particular architecture of the DC loop for eliminating the compensating DC offset in each cycle.

The following description is set forth mainly on the slope compensation circuit 100 in the controller with reference to the accompanying drawings.

Figure 3:
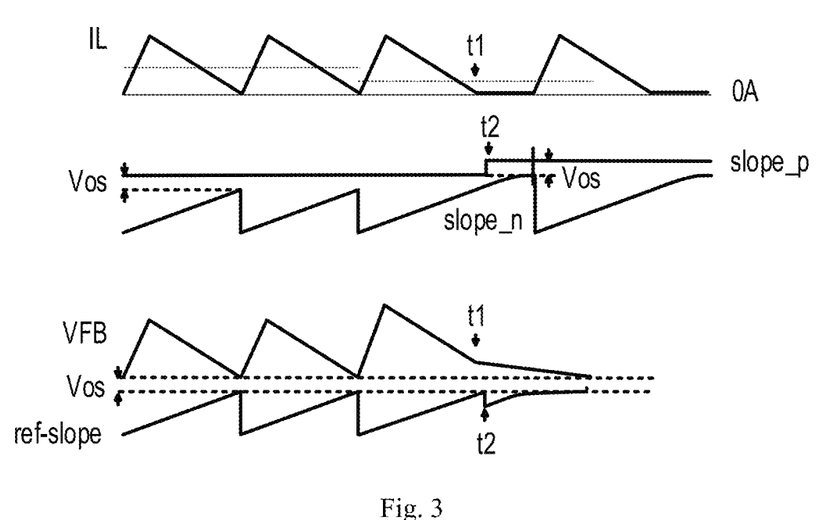
FIG. 3 schematically illustrates an inductor current, a slope voltage, a peak voltage and a sampled feedback voltage according to an embodiment of the present invention.

FIG. 3 schematically illustrates the inductor current, the slope voltage, the peak voltage and the sampled feedback voltage according to an embodiment of the present invention. In FIG. 3, the top graph shows a waveform of the inductor current IL (the dotted lines represent averages thereof), the middle graph shows waveforms of the periodically varying slope voltage (slope_n) and the peak voltage (slope_p) in the slope compensation approach according to this embodiment, and the bottom graph shows a comparison drawn between the sampled feedback voltage VFB and the compensation voltage (ref-slope). As shown in FIG. 3, the compensation slope consists of the periodically varying slope voltage slope_n (its amplitude is as same as that of the compensation slope) and the peak voltage slope_p (which is a steady-state peak value of the slope voltage slope_n). The slope compensation circuit 100 can provide the compensation voltage based on the peak voltage slope_p and the slope voltage slope_n. For example, the difference between the two, i.e., slope=slope_p-slope_n, may be taken as the compensation voltage applied to the reference voltage Vref. In this way, the applied compensation is related to relative values of the two voltages, rather than absolute values thereof. This can facilitate selection of normal operating points of the circuit. The compensation voltage ref-slope may be superimposed on, for example, the reference voltage Vref, and as a result of the superimposition, a compensated reference voltage may be obtained. The compensation voltage may not be zeroed at the ideal cycle length, so a margin may be left, in order to ensure that slopes of the sampled feedback voltage VFB and the compensated reference voltage at contact points will substantially unaffected when the cycles are disturbed.

In FIG. 3, during the first two cycles, the switched-mode power supply operates in the CCM that features small output ripple. The compensating DC offset Vos is the difference between the peak voltage slope_p of the slope compensation circuit 100 and a peak value of the slope voltage slope_n at the contact point at the end of each cycle in the CCM and can be corrected by the DC loop during steady-state operation. In the last cycle in FIG. 3, the switched-mode power supply changes to a discontinuous conduction mode, such as DCM, which features larger output ripple, and in which the inductor current (IL) crosses zero (0 A) at t1. Moreover, the upper power transistor S1 and the lower power transistor S2 in the switched-mode power supply are turned off, causing continuous discharge of the output capacitor and a ramp-down of the output voltage. Consequently, the slope of the sampled feedback voltage VFB changes. Differing from the conventional slope compensation approach, in this embodiment, the peak voltage slope_p is raised at t2 of the zero-crossing of the inductor current. For example, the peak voltage may be raised by a compensating DC offset 10 ms to 20 ms after the zero-crossing of the inductor current in the switched-mode power supply. It is to be noted that t2 may be either coincident with t1, or later than t1 possibly due to a delay in the circuit or a waiting time intentionally configured for the purpose of reliability. Specifically, the peak voltage slope_p may be raised at t2 by the compensating DC offset (Vos) that is eliminated by the DC loop in each cycle. Raising the peak voltage slope_p of the slope voltage by the compensating DC offset Vos is equivalent to clamping the compensation slope following the switching from the CCM to DCM, which eventually creates the difference between the feedback power supply voltage VFB and the reference voltage Vref at the contact point that is equal to the compensating DC offset Vos and can be corrected by the DC loop. In this way, in the event of a load jump, the valley of the sampled feedback voltage VFB can be maintained the same throughout the load switching, thereby completely offsetting any Vos error arising from switching between light and heavy load conditions. After the switched-mode power supply changes from the CCM to DCM, the peak voltage slope_p is maintained at the raised level until it is subtracted upon the switched-mode power supply switching from the DCM back to the CCM In this way, the difference between the feedback power supply voltage VFB and the reference voltage Vref at the contact point remains equal to the compensating DC offset Vos and can be corrected by the DC loop.

Figure 4:
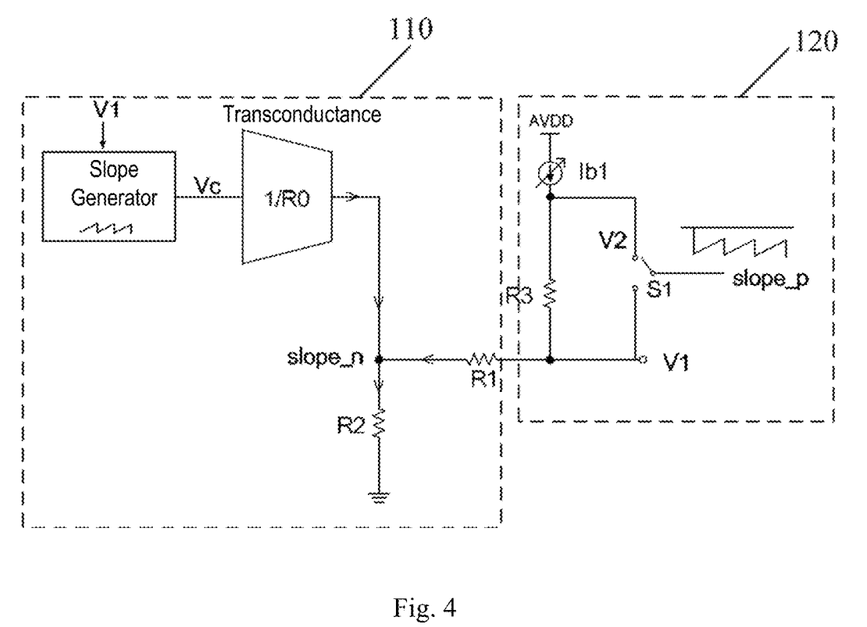
FIG. 4 is a schematic illustration of a slope compensation circuit according to an embodiment of the present invention.

FIG. 4 is a schematic illustration of the slope compensation circuit according to an embodiment of the present invention. As shown in FIG. 4, in an embodiment, the slope compensation circuit 100 accomplishes the outputting of the slope voltage slope_n and the peak voltage slope_p in an open loop manner. When the switched-mode power supply changes from the CCM to a discontinuous conduction mode, the peak voltage slope_p is raised by a compensating DC offset. When the switched-mode power supply changes from the discontinuous conduction mode back to the CCM, the compensating DC offset is subtracted from the peak voltage slope_p. The switched-mode power supply may switch from the CCM to the discontinuous conduction mode at a time determined by a moment at which a current flowing through the energy storage component (e.g., Lout in FIG. 2) drops to zero.

Specifically, referring to FIG. 4, the slope compensation circuit 100 may include a slope voltage output unit 110 including a slope generator, a transconductance amplifier, a first resistor R1 and a second resistor R2. The slope generator is configured to generate a periodic voltage signal Vc, and an amplitude of the periodic voltage signal Vc does not exceed an amplitude of a first voltage reference V1. The first voltage reference V1 is an internal constant reference voltage produced by the chip itself, which is stable and has a load-carrying capability. This voltage reference is used to determine correct operating points for the circuit and an upper limit for the peak of the slope voltage slope_n. The transconductance amplifier is coupled to an output of the slope generator and configured to convert the voltage signal Vc into a current signal. The first resistor R1 and the second resistor R2 are connected in series between the first voltage reference V1 and the ground with a connection node coupled to an output of the transconductance amplifier. The current signal at the output of the transconductance amplifier and the first voltage reference V1 together act on the second resistor R2 and thus produce a voltage serving as the aforementioned slope voltage slope_n.

In this embodiment, the slope compensation circuit 100 may further include a peak voltage output unit 120 configured to generate the aforementioned peak voltage slope_p. The peak voltage output unit 120 may include a selection circuit configured to raise the peak voltage slope_p by the compensating DC offset based on a moment at which the switched-mode power supply changes from the CCM to DCM and subtract the compensating DC offset from the peak voltage slope_p based on a moment at which the switched-mode power supply changes from the DCM to CCM.

In this embodiment, the peak voltage output unit 120 may further include a first current source Ib1 and a third resistor R3. Specifically, an input terminal of the first current source Ib1 is coupled to an on-chip power supply voltage AVDD, and its output terminal to one end of the third resistor R3. A voltage drop generated by the first current source Ib1 across the third resistor R3 is equal to the compensating DC offset that the peak voltage slope_p is raised by. The other end of the third resistor R3 is coupled to the first voltage reference V1, and a second voltage V2 is output from a node where the first current source Ib1 is coupled to the third resistor R3. In this embodiment, as the voltage drop generated by the first current source Ib1 across the third resistor R3 is just the offset voltage Vos discussed above, second voltage V2 can be expressed as V2=V1+Vos.

As shown in FIG. 4, the selection circuit may include a switch S1 such as a logic switch. When the switched-mode power supply changes from the DCM to CCM and starts operating in the CCM, the switch S1 disconnects with the second voltage V2 and selects the peak voltage slope_p from the peak voltage output unit 120 as the first voltage reference V1. When the switched-mode power supply changes from the CCM to DCM and starts operating in the DCM, the switch S1 disconnects with the first voltage reference V1 and selects the peak voltage slope_p as the second voltage V2.

The selection circuit may further include hysteresis unit (not shown), which is configured to cause introduce a first predetermined length of wait time before raising the peak voltage by the compensating DC offset when the switched-mode power supply changes from the continuous conduction mode to the discontinuous conduction mode. Moreover, it is configured to introduce a second predetermined length of wait time before subtracting the peak voltage by the compensating DC offset when the switched-mode power supply changes from the discontinuous conduction mode to the continuous conduction mode. This can reduce the risk of misoperation under critical load conditions and enhance system robustness.

If a switching period of the switched-mode power supply is denoted as tsw and the capacitance of a capacitor on which the voltage signal Vc generated by the slope generator is stored as C, the amplitude of the voltage signal Vc can be expressed as: Vc=Ib1*tsw/C.

Through correlating the slope generator with a switching frequency of the switched-mode power supply, the voltage signal Vc can be output with constant amplitudes at different frequencies. The downstream transconductance amplifier converts the voltage signal Vc to the current signal at a predetermined ratio. If an equivalent resistor of the transconductance amplifier is denoted as R0, the slope voltage slope_n generated by the slope voltage output unit 110 can be expressed as: Slope_n=(V1/R1+Vc/R0)*(R1/R2).

As Vc<V1 as discussed above, we can obtain: Slope_n<V1*(R1/R2)/(R1/R0).

Through reasonably designing ratios of the resistors R0, R1, R2, the slope voltage slope_n can stabilize at the first voltage reference V1 during operation in the DCM. FIG. 3 shows waveforms of the slope voltage slope_n and the peak voltage slope_p in response to a change from the CCM to DCM according to this embodiment. The circuit of the peak voltage output unit 120 shown in FIG. 4 provides the peak voltage slope_p in an open loop manner. It is advantageous in fast response and a simple structure.

Figure 5:
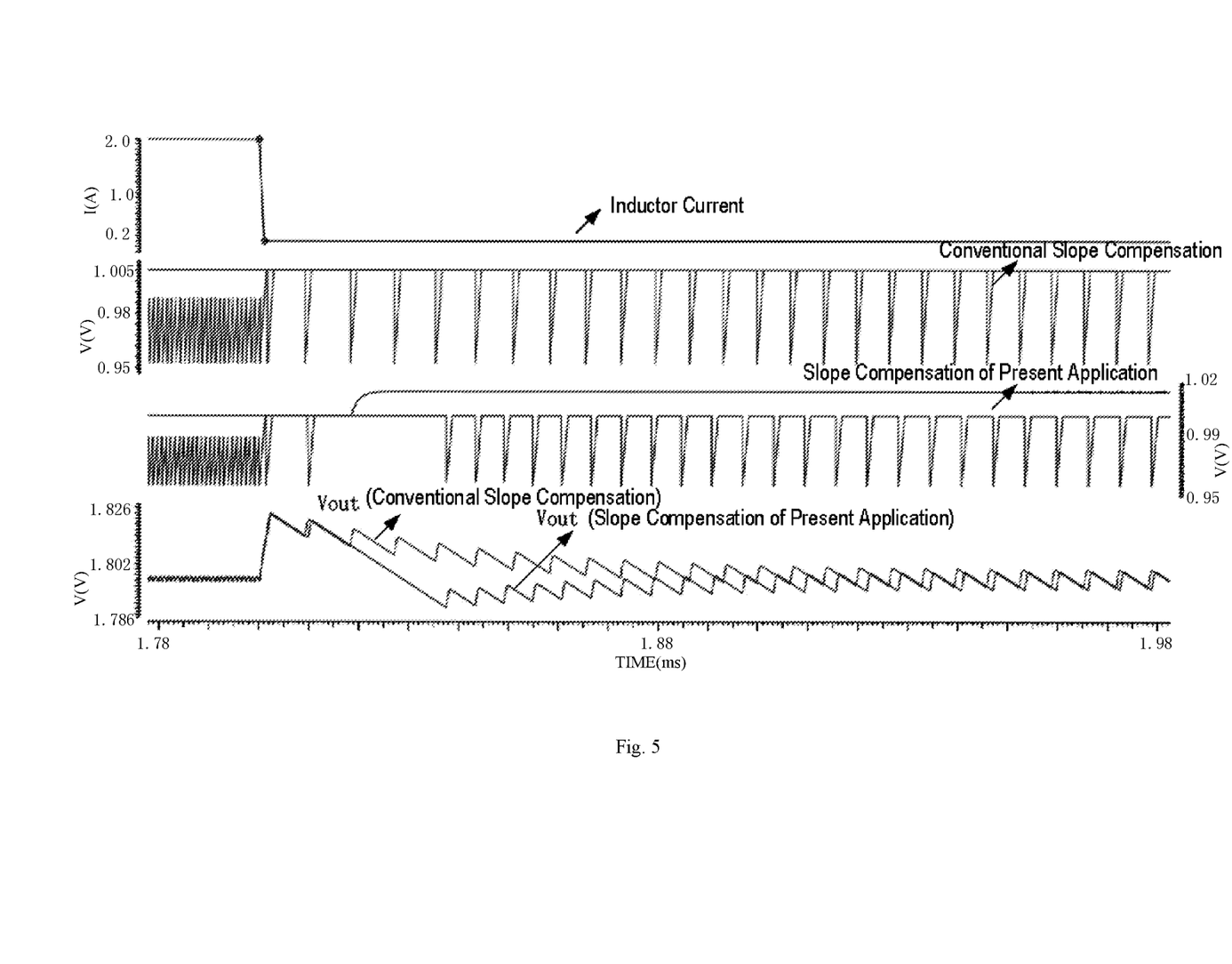
FIG. 5 shows a comparison between compensation slope and output voltage simulation results of the switched-mode power supply according to an embodiment of the present invention and a switched-mode power supply employing the conventional slope compensation approach in response to a jump from a CCM to a DCM.
Figure 6:
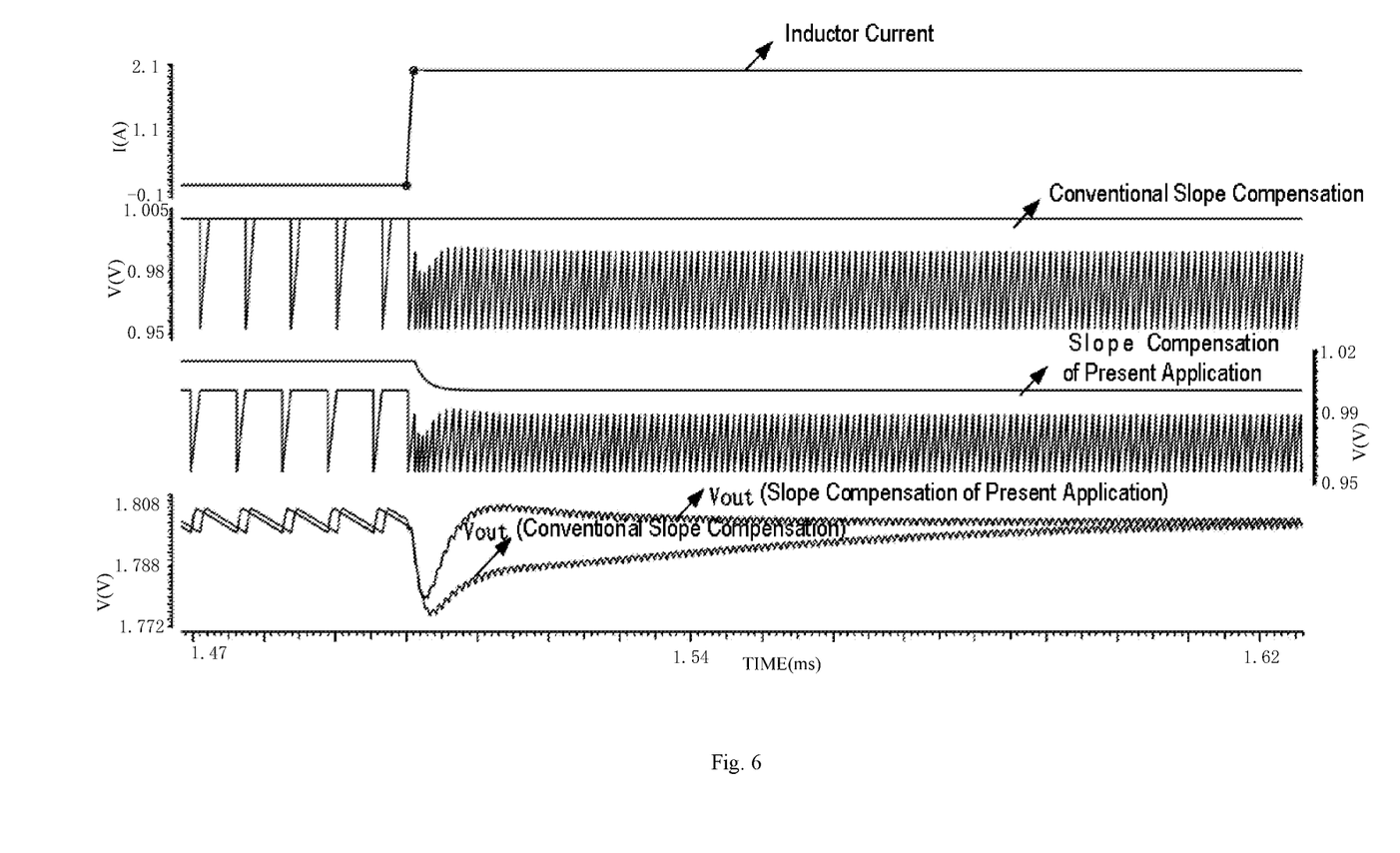
FIG. 6 shows a comparison between compensation slope and output voltage simulation results of the switched-mode power supply according to an embodiment of the present invention and a switched-mode power supply employing the conventional slope compensation approach in response to a jump from the DCM to CCM.

FIG. 5 shows a comparison between compensation slope and output voltage simulation results of the switched-mode power supply according to an embodiment of the present invention and the conventional slope compensation approach in response to a jump from the CCM to DCM. FIG. 6 shows a comparison between compensation slope and output voltage simulation results of the switched-mode power supply according to an embodiment of the present invention and the conventional slope compensation approach in response to a jump from the DCM to CCM. In both FIGS. 5 and 6, the topmost graph shows a waveform of the inductor current, which drops in response to the jump from the CCM to DCM and rises in response to the jump from the DCM to CCM. The second topmost graph shows slope voltage slope_n and peak voltage slope_p waveforms of the switched-mode power supply employing the conventional slope compensation approach (labeled as "Conventional Slope Compensation"). The second bottommost graph shows slope voltage slope_n and peak voltage slope_p waveforms of the switched-mode power supply employing the slope compensation approach according to this embodiment ("Slope Compensation of the Present Application"). The bottommost graph shows output DC voltage waveforms of the conventional slope compensation approach ("Vout (Conventional Slope Compensation)") and the slope compensation approach according to this embodiment ("Vout (Slope Compensation of the Present Application)").

As can be seen from the comparison between the output DC voltage waveform of the conventional slope compensation approach and the output DC voltage waveform of the slope compensation approach according to this embodiment shown in FIGS. 5 and 6, compared to the conventional slope compensation approach, the slope compensation approach according to this embodiment enables the output DC voltage Vout to more rapidly stabilize at the target values after switching between the two different load conditions, resulting in faster recovery and effectively optimized performance characteristics during instantaneous load jump.

In some other embodiments, in order to clamp a DC value of the sampled feedback voltage VFB to the same reference voltage during load jumps, during operation of the switched-mode power supply in the CCM, the compensating DC offset Vos that has been corrected by the DC loop can be sampled and stored. As marked by a signal indicating zero-crossing of the inductor current or a delayed form thereof, the sampled compensating DC offset Vos may be superimposed onto the peak voltage slope_p in the event of the switched-mode power supply jumping from the CCM to a discontinuous conduction mode, and removed in the event of the switched-mode power supply jumping from the discontinuous conduction mode back to the CCM. Alternatively, the valley of the feedback voltage VFB may be maintained at a constant level both under constant load conditions and during load jumps. Compared with the conventional slope compensation approach, this can significantly reduce upward and downward overshooting of the output voltage during load jumps.

The following description is set forth mainly on the slope compensation circuit according to another embodiment of the present invention with reference to the accompanying drawings. In the slope compensation circuit 100 according to this embodiment, the slope voltage output unit 110 of FIG. 4 may also be used to produce the periodically varying slope voltage slope_n, but the peak voltage slope_p may be produced in a different manner. In this embodiment, the slope compensation circuit 100 utilizes a feedback loop to cause the peak voltage slope_p to follow a peak level of the peak slope voltage slope_n to vary within each switching period of the switched-mode power supply. When the switched-mode power supply changes from the CCM to DCM, following an increase of the peak level of the slope voltage slope_n by a compensating DC offset (e.g., Vos in FIG. 1), the peak voltage slope_p is also raised by the compensating DC offset. On the contrary, when the switched-mode power supply changes from the DCM to CCM, the compensating DC offset is subtracted from the peak voltage slope_p.

Figure 7:
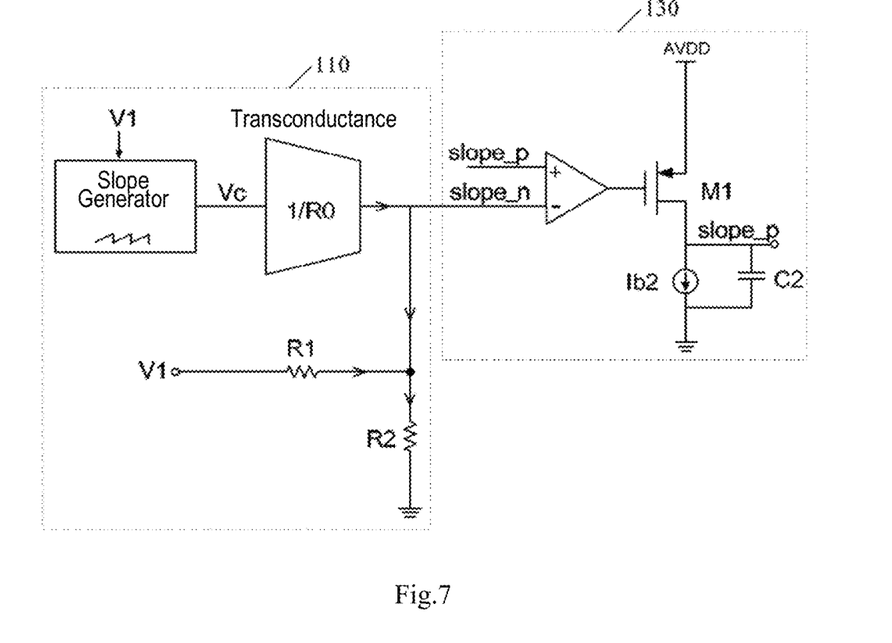
FIG. 7 is a schematic illustration of the slope compensation circuit according to another embodiment of present invention.

FIG. 7 is a schematic illustration of the slope compensation circuit according to another embodiment of the present invention. Referring to FIG. 7, in this embodiment, the slope compensation circuit 100 includes a peak voltage output unit 130 for producing the aforementioned peak voltage slope_p. The peak voltage output unit 130 may further include:

- a first capacitor (C2) having a first end at which the peak voltage slope_p is output and another end that is grounded;
- a second current source (Ib2) having an input terminal coupled to the first end of the output capacitor and an output terminal that is grounded, the second current source configured to provide a discharge path for the peak voltage slope_p;
- an operational amplifier (op-amp) having one input terminal where the peak voltage slope_p is received and another input terminal where the slope voltage slope_n output from the slope voltage output unit 110 is received; and
- a switching transistor (M1) having a control terminal coupled to an output terminal of the op-amp, the switching transistor configured to be turned on upon the peak voltage slope_p dropping below the slope voltage slope_n, to allow the first capacitor to be charged with the on-chip power supply voltage AVDD via the switching transistor until the peak voltage slope_p reaches the slope voltage slope_n.

In the embodiment of FIG. 7, specifically, the peak voltage slope_p may be so controlled that, when slope_p drops below slope_n, the op-amp pulls down a gate voltage of the switching transistor M1, enabling a current to be immediately provided to the first capacitor C2 that outputs slope_p until the M1 path is turned off upon slope_p rising to reach slope_n. The discharge path for slope_p provided by the current source Ib2 enables slope_p to dynamically stabilize at the peak level of slope_n. As a result, the compensation slope can be automatically zeroed at the contact point at the end of each switching period. It is to be noted that, although the aforementioned switching transistor M1 is implemented as a PMOS transistor and the non-inverting input terminal of the op-amp is coupled to the peak voltage slope_p and the inverting input terminal thereof to the slope voltage slope_n in the embodiment of FIG. 7, the present invention is not so limited, because the switching transistor M1 may also be implemented as any other suitable switching device. For example, in another embodiment, the switching transistor M1 may be implemented as an NMOS transistor, with the inverting input terminal of the op-amp being coupled to the peak voltage slope_p and the non-inverting input terminal thereof to the slope voltage slope_n, while still achieving the effect of following the peak level provided by the peak voltage output unit 130 in FIG. 7. In yet another embodiment, the switching transistor M1 may be implemented as an NMOS transistor, with the non-inverting input terminal of the op-amp being coupled to the peak voltage slope_p and the inverting input terminal thereof to the slope voltage slope_n, and an inverter may be disposed between the op-amp's output terminal and the control terminal of the switching transistor M1. Alternatively, the switching transistor M1 may be implemented as a PMOS transistor, with the non-inverting input terminal of the op-amp being coupled to the peak voltage slope_p and the inverting input terminal thereof to the slope voltage slope_n, and an inverter may be disposed between the op-amp's output terminal and the control terminal of the switching transistor M1. All of these embodiments can achieve the effect of following the peak level provided by the peak voltage output unit 130 in FIG. 7.

Figure 8:
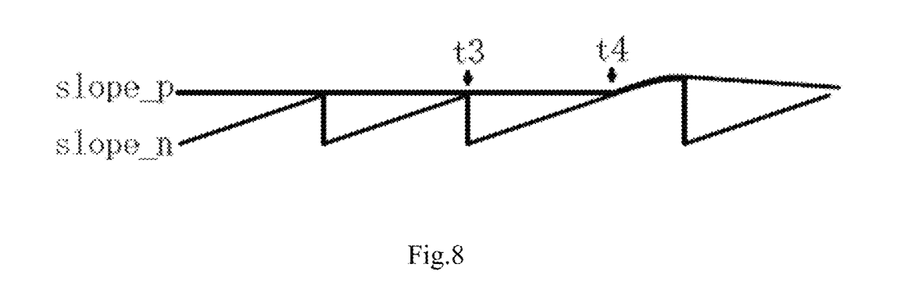
FIG. 8 schematically illustrates waveforms of the slope voltage and the peak voltage according to another embodiment of present invention.

As shown in FIG. 8, in this embodiment, at t3 and t4, the peak voltage slope_p is discharged via the Ib2 path to levels slightly lower than slope_n, triggering the current sourcing path through the switching transistor M1 to be turned on to pull slope_p up to slope_n. As can be seen from FIG. 8, both in the continuous conduction mode during the first two cycles and in the discontinuous conduction mode during the subsequent cycles, slope_p can follow the peak level of slope_n to vary. In response to a change of the switched-mode power supply from the CCM to DCM, following an increase of the peak level of the slope voltage slope_n by the compensating DC offset, the peak voltage slope_p is also raised by the compensating DC offset, thereby automatically zeroing an additional DC offset introduced by the compensation slope during the load jump. At the same time, the reference voltage Vref and the valley of the sampled feedback voltage VFB remains the same compensating DC offset as prior to the jump, which can be corrected by the DC loop. In this way, the valley of the sampled feedback voltage VFB can remain unchanged both under constant load conditions and during load jumps, effectively reducing upward and downward overshooting of the output voltage during load jumps, when compared to the conventional slope compensation approach.

Embodiments of the present invention also relate to a method for controlling a switched-mode power supply, which can eliminate an additional DC offset that would be introduced by the conventional slope compensation approach and allows a valley of a sampled feedback voltage VFB to remain unchanged both under steady load conditions and during load jumps. The switched-mode power supply is configured to convert an input DC voltage (VIN) into an output DC voltage (Vout).

Figure 9:
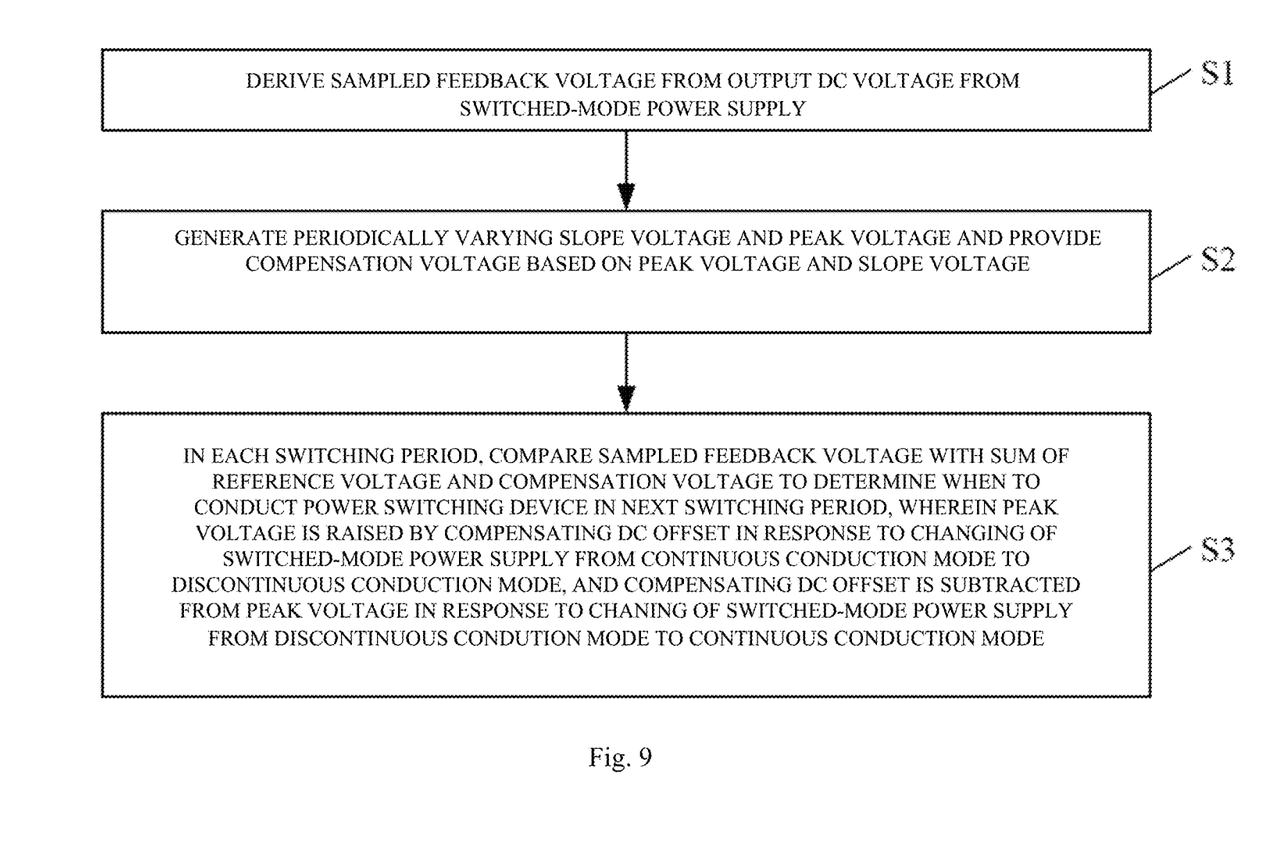
FIG. 9 schematically illustrates a method for controlling a switched-mode power supply according to an embodiment of the present invention.

FIG. 9 schematically illustrates the method for controlling a switched-mode power supply according to an embodiment of the present invention. Referring to FIG. 9, the method includes the steps of:

S1: obtaining the sampled feedback voltage based on an output DC voltage of the switched-mode power supply;

S2: generating a periodically varying slope voltage and a peak voltage, and providing a compensation voltage based on the peak voltage and the slope voltage; and S3: in each switching period, comparing the sampled feedback voltage and the sum of a reference voltage and the compensation voltage to determine when to conduct a power switching device in the next switching period, wherein the peak voltage is raised by a compensating DC offset in response to a change of the switched-mode power supply from the a continuous conduction mode (CCM) to a discontinuous conduction mode (DCM), and the compensating DC offset is subtracted from the peak voltage in response to a change of the switched-mode power supply from the discontinuous conduction mode to the continuous conduction mode.

In this method, the generation of the peak voltage may be accomplished in an open loop manner, in which the peak voltage is alone raised by the compensating DC offset in response to a change of the switched-mode power supply from the CCM to the discontinuous conduction mode. Alternatively, a feedback loop may be utilized to enable the peak voltage to dynamically follow a peak level of the slope voltage to vary in each switching period of the switched-mode power supply. In this case, in response to a change of the switched-mode power supply from the CCM to the discontinuous conduction mode, following an increase of the slope voltage by the compensating DC offset, the peak voltage is also raised by the compensating DC offset. For specific circuit implementations, reference can be made to the foregoing embodiments of the slope compensation circuit, and further detailed description is omitted here.

The method may further include DC correction configured to: compare the sampled feedback voltage with the reference voltage and clamp a steady-state value of the sampled feedback voltage at the reference voltage by error amplifier.

In this method, steps S1 to S3 are repeated over cycles and the numbering of them does not necessarily imply their temporal ordering. Steps S1 and S2 for obtaining the sampled feedback voltage and the compensation voltage, respectively, can be performed in parallel.

In the controller, switched-mode power supply and method according to embodiments of the present invention, in response to a change of the switched-mode power supply from the CCM to DCM, slope compensation is carried out to raise the output peak voltage by a compensating DC offset. Moreover, in response to a change of the switched-mode power supply from the DCM to CCM, the compensating DC offset is subtracted from the peak voltage. In this way, an additional DC offset that would be introduced by the conventional slope compensation approach can be eliminated, maintaining the valley of the sampled feedback voltage constant both under steady load conditions and during load jumps. Compared with the conventional slope compensation approach, upward and downward overshooting of the output voltage can be effectively reduced and performance of the switched-mode power supply during instantaneous load jumps can be enhanced.

It is to be noted that the embodiments disclosed herein are described in a progressive manner, with the description of each embodiment focusing on its differences from others. Reference can be made between the embodiments for their identical or similar parts.

The foregoing description is merely that of several preferred embodiments of the present invention and is not intended to limit the scope of the claims of the invention in any way. Any person of skill in the art may make various possible variations and changes to the disclosed embodiments in light of the methodologies and teachings disclosed hereinabove, without departing from the spirit and scope of the invention. Accordingly, any and all such simple variations, equivalent alternatives and modifications made to the foregoing embodiments based on the essence of the present invention without departing from the scope of the embodiments are intended to fall within the scope of protection of the invention.

What is claimed is:

1. A controller for controlling a power switching device in a switched-mode power supply, the switched-mode power supply configured for converting an input DC voltage to an output DC voltage, wherein the controller comprises:

a sampling and feedback circuit, configured to derive a sampled feedback voltage from the output DC voltage;

a slope compensation circuit, configured to output a periodically varying slope voltage and a peak voltage and to provide a compensation voltage based on the peak voltage and the slope voltage; and a comparison circuit configured to, in each switching period, compare the sampled feedback voltage with a sum of a reference voltage and the compensation voltage to determine when to conduct the power switching device in next switching period, wherein the peak voltage is raised by a compensating DC offset in response to a change of the switched-mode power supply from a continuous conduction mode to a discontinuous conduction mode, and the compensating DC offset is subtracted from the peak voltage in response to a change of the switched-mode power supply from the discontinuous conduction mode to the continuous conduction mode.

2. The controller of claim 1, wherein the comparison circuit comprises a DC correction circuit configured to compare the sampled feedback voltage with the reference voltage, and to clamp a steady-state value of the sampled feedback voltage at the reference voltage by an error amplifier.

3. The controller of claim 1, wherein the slope compensation circuit comprises:
a slope generator, configured to generate a periodic voltage signal with an amplitude below a value of a first voltage reference;
a transconductance amplifier coupled to an output of the slope generator and configured to convert the voltage signal into a current signal; and
a first resistor and a second resistor connected in series between the first voltage reference and the ground with a connection node coupled to an output of the transconductance amplifier so that a voltage generated by the current signal and the first voltage reference on the second resistor serves as the slope voltage.

4. The controller of claim 1, wherein the slope compensation circuit comprises a peak voltage output unit for generating the peak voltage, wherein the peak voltage output unit comprises:
a selection circuit configured to raise the peak voltage by the compensating DC offset based on a moment at which the switched-mode power supply changes from the continuous conduction mode to the discontinuous conduction mode, and to subtract the compensating DC offset from the peak voltage based on a moment at which the switched-mode power supply changes from the discontinuous conduction mode to the continuous conduction mode.

5. The controller of claim 4, wherein the peak voltage output unit further comprises a first current source and a third resistor, wherein: the first current source is coupled to a first end of the third resistor; a voltage drop generated by the first current source across the third resistor is equal to the compensating DC offset; the third resistor is coupled at a second end to a first voltage reference; a second voltage is output from a connection node between the first current source and the third resistor; the selection circuit selects the second voltage as the peak voltage in response to a change of the switched-mode power supply from the continuous conduction mode to the discontinuous conduction mode and selects the first voltage reference as the peak voltage in response to a change of the switched-mode power supply from the discontinuous conduction mode to the continuous conduction mode.

6. The controller of claim 5, wherein the selection circuit further comprises a hysteresis unit configured to introduce a first predetermined length of wait time before raising the peak voltage by the compensating DC offset when the switched-mode power supply changes from the continuous conduction mode to the discontinuous conduction mode, and to introduce a second predetermined length of wait time before subtracting the peak voltage by the compensating DC offset when the switched-mode power supply changes from the discontinuous conduction mode to the continuous conduction mode.

7. The controller of claim 4, wherein the selection circuit further comprises a hysteresis unit configured to introduce a first predetermined length of wait time before raising the peak voltage by the compensating DC offset when the switched-mode power supply changes from the continuous conduction mode to the discontinuous conduction mode, and to introduce a second predetermined length of wait time before subtracting the peak voltage by the compensating DC offset when the switched-mode power supply changes from the discontinuous conduction mode to the continuous conduction mode.

8. The controller of claim 1, wherein the slope compensation circuit comprises a peak voltage output unit for generating the peak voltage, wherein the peak voltage output unit comprises:
a first capacitor having a first end at which the peak voltage is output and a second end that is grounded;
a second current source having an input terminal coupled to the first end of the first capacitor and an output terminal that is grounded, wherein the second current source provides a discharge path for the peak voltage;
an operational amplifier having a first input terminal at which the peak voltage is received and a second input terminal at which the slope voltage is received; and
a switching transistor having a control terminal coupled to the output terminal of the operational amplifier, wherein the switching transistor is turned on in an event of the peak voltage dropping below the slope voltage to allow an on-chip power supply to charge the first capacitor through the switching transistor until the peak voltage reaches the slope voltage.

9. A switched-mode power supply comprising a power switching device, an energy storage component, an output capacitor and a controller, the controller configured to control the power switching device to periodically feed an input DC voltage to the energy storage component and the output capacitor so as to obtain an output DC voltage on the output capacitor, wherein the controller comprises:
a sampling and feedback circuit, configured to derive a sampled feedback voltage from the output DC voltage,
a slope compensation circuit, configured to output a periodically varying slope voltage and a peak voltage and to provide a compensation voltage based on the peak voltage and the slope voltage,
a comparison circuit configured to, in each switching period, compare the sampled feedback voltage with a sum of a reference voltage and the compensation voltage to determine when to conduct the power switching device in a next switching period,
wherein the peak voltage is raised by a compensating DC offset in response to a change of the switched-mode power supply from a continuous conduction mode to a discontinuous conduction mode, and the compensating DC offset is subtracted from the peak voltage in response to a change of the switched-mode power supply from the discontinuous conduction mode to the continuous conduction mode.

10. The switched-mode power supply of claim 9, wherein the comparison circuit comprises a DC correction circuit configured to compare the sampled feedback voltage with the reference voltage and to clamp a steady-state value of the sampled feedback voltage at the reference voltage by an error amplifier.

11. The switched-mode power supply of claim 9, wherein the slope compensation circuit comprises:
a slope generator configured to generate a periodic voltage signal with an amplitude below a value of a first voltage reference;
a transconductance amplifier coupled to an output of the slope generator and configured to convert the voltage signal into a current signal; and
a first resistor and a second resistor connected in series between the first voltage reference and the ground with a connection node coupled to an output of the transconductance amplifier so that a voltage generated by the current signal and the first voltage reference on the second resistor serves as the slope voltage.

12. The switched-mode power supply of claim 9, wherein the slope compensation circuit comprises a peak voltage output unit for generating the peak voltage, wherein the peak voltage output unit comprises:
 a selection circuit configured to raise the peak voltage by the compensating DC offset based on a moment at which the switched-mode power supply changes from the continuous conduction mode to the discontinuous conduction mode, and to subtract the compensating DC offset from the peak voltage based on a moment at which the switched-mode power supply changes from the discontinuous conduction mode to the continuous conduction mode.

13. The switched-mode power supply of claim 12, wherein the peak voltage output unit further comprises a first current source and a third resistor, wherein the first current source is coupled to a first end of the third resistor, a voltage drop generated by the first current source across the third resistor is equal to the compensating DC offset; the third resistor is coupled at a second end to a first voltage reference; a second voltage is output from a connection node between the first current source and the third resistor; the selection circuit selects the second voltage as the peak voltage in response to a change of the switched-mode power supply from the continuous conduction mode to the discontinuous conduction mode, and selects the first voltage reference as the peak voltage in response to a change of the switched-mode power supply from the discontinuous conduction mode to the continuous conduction mode.

14. The switched-mode power supply of claim 13, wherein the selection circuit further comprises a hysteresis unit configured to introduce a first predetermined length of wait time before raising the peak voltage by the compensating DC offset when the switched-mode power supply changes from the continuous conduction mode to the discontinuous conduction mode, and to introduce a second predetermined length of wait time before subtracting the peak voltage by the compensating DC offset when the switched-mode power supply changes from the discontinuous conduction mode to the continuous conduction mode.

15. The switched-mode power supply of claim 12, wherein the selection circuit further comprises a hysteresis unit configured to introduce a first predetermined length of wait time before raising the peak voltage by the compensating DC offset when the switched-mode power supply changes from the continuous conduction mode to the discontinuous conduction mode, and to introduce a second predetermined length of wait time before subtracting the peak voltage by the compensating DC offset when the switched-mode power supply changes from the discontinuous conduction mode to the continuous conduction mode.

16. The switched-mode power supply of claim 12, wherein the moment at which the switched-mode power supply changes from the continuous conduction mode to the discontinuous conduction mode is determined based on a moment at which a current flowing through the energy storage component drops to zero.

17. The switched-mode power supply of claim 9, wherein the slope compensation circuit comprises a peak voltage output unit for generating the peak voltage, wherein the peak voltage output unit comprises:
 a first capacitor having a first end at which the peak voltage is output and a second end that is grounded;
 a second current source having an input terminal coupled to the first end of the first capacitor and an output terminal that is grounded, wherein the second current source provides a discharge path for the peak voltage;
 an operational amplifier having a first input terminal where the peak voltage is received and a second input terminal where the slope voltage is received; and
 a switching transistor having a control terminal coupled to the output terminal of the operational amplifier, wherein the switching transistor is turned on in an event of the peak voltage dropping below the slope voltage to allow an on-chip power supply to charge the first capacitor through the switching transistor until the peak voltage reaches the slope voltage.

18. A method for controlling a switched-mode power supply to convert an input DC voltage to an output DC voltage, wherein the method comprises:
 deriving a sampled feedback voltage from the output DC voltage;
 generating a periodically varying slope voltage and a peak voltage, and providing a compensation voltage based on the peak voltage and the slope voltage; and
 in each switching period, comparing the sampled feedback voltage with a sum of a reference voltage and the compensation voltage to determine when to conduct a power switching device in a next switching period,
 wherein the peak voltage is raised by a compensating DC offset in response to a change of the switched-mode power supply from a continuous conduction mode to a discontinuous conduction mode, and the compensating DC offset is subtracted from the peak voltage in response to a change of the switched-mode power supply from the discontinuous conduction mode to the continuous conduction mode.

19. The method of claim 18, further comprising a DC correction for comparing the sampled feedback voltage with the reference voltage and clamping a steady-state value of the sampled feedback voltage at the reference voltage by an error amplifier.

* * * * *